(12) United States Patent
Gilboa et al.

(10) Patent No.: US 7,805,740 B2
(45) Date of Patent: Sep. 28, 2010

(54) SYSTEM AND METHOD FOR PROVIDING ADVERTISEMENT BASED ON SPEECH RECOGNITION

(75) Inventors: Shai Haim Gilboa, Atlit (IL); Daniel Fogel, Bat Yam (IL)

(73) Assignee: Audiogate Technologies Ltd., Atlit (IL)

(*) Notice: Subject to any disclaimer, the term of this patent is extended or adjusted under 35 U.S.C. 154(b) by 463 days.

(21) Appl. No.: 11/937,848

(22) Filed: Nov. 9, 2007

(65) Prior Publication Data

US 2008/0115163 A1    May 15, 2008

Related U.S. Application Data

(60) Provisional application No. 60/865,171, filed on Nov. 10, 2006.

(51) Int. Cl.
*H04H 60/32* (2008.01)
(52) U.S. Cl. .................. 725/18; 725/14; 725/32; 725/34; 725/35; 725/36; 379/88.14; 379/88.01; 379/88.04; 705/14.25; 705/14.4; 705/14.49; 705/14.5; 705/14.53; 705/14.66; 705/14.68; 455/414.4; 704/246
(58) Field of Classification Search ............ 725/14, 725/18, 34–36; 379/88.14, 88.01, 88.04; 705/14.25, 14.4, 14.49, 14.5, 14.53, 14.66, 705/14.68; 455/414.4; 704/246
See application file for complete search history.

(56) References Cited

U.S. PATENT DOCUMENTS

| 6,788,675 | B1 | 9/2004 | Yang | 370/352 |
|---|---|---|---|---|
| 6,839,356 | B2 | 1/2005 | Barany et al. | 370/401 |
| 6,993,326 | B2 | 1/2006 | Link, II et al. | 455/414.1 |
| 7,200,139 | B1 | 4/2007 | Chu et al. | 370/352 |
| 7,567,846 | B2 * | 7/2009 | Sztybel | 700/94 |

(Continued)

FOREIGN PATENT DOCUMENTS

DE    202005008640 U1    7/2006

(Continued)

OTHER PUBLICATIONS

Baltatzis, Patrick, "Why VOIP is Headed for Your Cell Phone", CNN Money.com, Internet at <http://money.cnn.com/2006/05/04/technology/business2_thirdscreen/index.htm>, May 4, 2006, 2 pages.

(Continued)

*Primary Examiner*—Jason P Salce
(74) *Attorney, Agent, or Firm*—Grasso PLLC; Fred Grasso

(57) ABSTRACT

This invention relates to a system and method for providing dedicated television advertisements based on speech recognition of telephone conversations. The home user makes telephone calls using a landline, cellular phone or VoIP phone. The user may also be watching TV. While doing so, the user is able to see advertisements on part or all of his TV screen, based on words and phrases he may have used during his telephone conversation(s). The system and method may be provided by a triple play or quad play service provider which associates its users' telephone calls with TV advertising. Once the user sees the advertisement he can get more information concerning the advertisement by clicking on it with a pointing device, e.g., a mouse or TV remote control, or by using any other navigation method the TV system provides, to see additional details concerning the advertisements.

27 Claims, 3 Drawing Sheets

U.S. PATENT DOCUMENTS

| | | | |
|---|---|---|---|
| 2001/0001000 A1 | 5/2001 | Thomas et al. | 370/200 |
| 2002/0076019 A1 | 6/2002 | Tandon et al. | 379/114.14 |
| 2002/0103647 A1 | 8/2002 | Houplain | 704/260 |
| 2002/0107027 A1 | 8/2002 | O'Neil | 455/456 |
| 2004/0204084 A1 | 10/2004 | Tan et al. | 455/557 |
| 2004/0228336 A1 | 11/2004 | Kung et al. | 370/352 |
| 2005/0160166 A1 | 7/2005 | Kraenzel | 709/224 |
| 2005/0286466 A1 | 12/2005 | Tagg et al. | 370/329 |
| 2006/0015399 A1 | 1/2006 | Alberth, Jr. et al. | 705/14 |
| 2006/0212897 A1* | 9/2006 | Li et al. | 725/32 |
| 2006/0245395 A1 | 11/2006 | Jain et al. | 370/331 |
| 2006/0268833 A1 | 11/2006 | Yardley | 370/352 |
| 2007/0002837 A1 | 1/2007 | Tan | 370/352 |
| 2007/0049245 A1 | 3/2007 | Lipman | 455/406 |
| 2007/0078708 A1 | 4/2007 | Yu et al. | 705/14 |
| 2007/0078709 A1* | 4/2007 | Rajaram | 705/14 |
| 2007/0165823 A1 | 7/2007 | Haldeman et al. | 379/218.01 |
| 2007/0174258 A1 | 7/2007 | Jones et al. | 707/3 |
| 2007/0201636 A1* | 8/2007 | Gilbert et al. | 379/88.14 |

FOREIGN PATENT DOCUMENTS

| | | |
|---|---|---|
| EP | 1379068 A1 | 1/2004 |
| WO | WO 01/31497 | 5/2001 |
| WO | WO2004/112268 | 12/2004 |
| WO | WO 2007/089967 | 8/2007 |

OTHER PUBLICATIONS

CallWave, Inc., "CallWave Announces National Availability of First VoIP-Enhanced Cell Phone", *Business Wire*, Internet at <http://www.internetvideomag.com/News/News2005/070405_Callwave.htm>, Aug. 4, 2005, 3 pages.

Blau, John, "New VoIP Service for Cell Phones", *PC World*, Internet at <http://www.pcworld.com/printable/article/id,129114/printable.html>, Feb. 16, 2007, 2 pages.

Shinder, Deb, "USB Devices Make VoIP Portable", *CNET Networks Business*, Internet at <http://articles.techrepublic.com.com/5100-1035_11-6168126.html>, Mar. 16, 2007, 4 pages.

"SyChip Unveils SyVoice™ Family of VoIP Solutions for the Mobile Handset Market", SyChip, Inc., May 23, 2005, 2 pages.

"VWLAN7101 Product Brief; Embedded Module for Mobile Voice Over IP (VoIP) Applications"; SyChip, Inc., no date, 2 pages.

Nass, Richard, "VoIP Module can be Integrated into Digital Handsets", *CommsDesign*, Internet at http://www.commsdesign.com, May 24, 2005, 3 pages.

UTStarcom, Inc., "UTStarcom Introduces the World's First PAS Handset with Embedded Personal Identity Module Technology at the PT/Expo Comm China 2004 Show in Beijing", *PR Newswire*, Internet at <http://investorrelations.utstar.com/ReleaseDetail.cfm?ReleaseID=146378>, Oct. 25, 2004, 3 pages.

"SIM Card for Your VoIP Phone", LucaFiligheddu.com, Internet at <http://www.lucafiligheddu.com/2006/10/sim-card-for-your-voip-phone.html>, 2006, 8 pages.

Cassia, Fernando, "VoIP to GSM Gateway can Save You a Bundle", *The Inquirer*, Internet at <http://www.theinquirer.net/en/inquirer/news/2005/10/05/voip-to-gsm-gateway-can-save-you-a-bundle.html>, Oct. 5, 2005, 4 pages.

Tehrani, Rich, "Getting Paid to VoIP", VoIP Blog—Tehrani.com, Internet at <http://blog.tmcnet.com/blog/rich-tehrani/voip/getting-paid-to-voip.html>, Feb. 14, 2006, 4 pages.

Keating, Tom, "Cash Back VoIP Calling", VoIP & Gadgets Blog, Internet at <http://blog.tmcnet.com/blog/tom-keating/voip/cash-back-voip-calling.asp>, Feb. 14, 2006, 5 pages.

Kolodziej, Krzysztof, Navizon—The Ultimate Personal Navigation Companion?, *Directions Magazine*, Internet at <http://www.directionsmag.com/printer.php?article_id=2266>, Aug. 29, 2006, 3 pages.

Relph-Knight, Terry, "VoIP Toolkit: A Guide to VoIP Telephony", ZDNet.co.uk, Internet at <http://reviews.zdnet.co.uk/hardware/networking/0,1000000696,39279773,00.htm>, Jul. 26, 2006, 3 pages.

"Tpad—The Global Phone Network", Internet at <http://web.archive.org/web/20061114133459/www.tpad.com/products.php>, copyright 2006, 2 pages.

"What Do You Want to See from VoIP User?", <http://www.voipuser.org/forum_topic_5972.html>, Jun. 19, 2006, 5 pages.

"Receive Calls on VOIP & Get Credits", Internet at <http://voipguides.blogspot.com/2006/12/receive-calls-on-voip-get-credits.html>, Dec. 15, 2006, 3 pages.

"TMN Promotes Mass Use of Mobile Phones and Adds a Revolutionary Concept to its Prepaid Cards: PAKO Charged by Incoming Calls", Internet Citation, [Online] XP-002224217, <URL:http://www.tmn.pt/tmn/noticias/2000_17abr_1.shtml> [retrieved on Dec. 9, 2002, 1 page.

Schaefer, Volker, "VIAG: Bei Anruf—Guthaben", Internet Citation, [Online] XP-002224216, <URL:http://www.teltarif.de/arch/2000/kw44/s3423.html> [retrieved on Dec. 2, 2002, 1 page.

Noyes, Katherine, "Big Brother Eyes VoIP? The Proof Is in the Pudding", *TechNews World*, Internet at <http://www.technewsworld.com/story/59483.html>, Sep. 24, 2007, 2 pages.

Pushback from a Customer on Voice Ads—Gnutella Forums, Internet at <http://www.gnutellaforums.com/rants/17900-pushback-customer-voice-ads.html> copyright 2000-2007, Jelsoft Enterprises Ltd, 4 pages.

* cited by examiner

SYSTEM AND METHOD FOR PROVIDING ADVERTISEMENT BASED ON SPEECH RECOGNITION

This application claims priority to U.S. Provisional Application Ser. No. 60/865,171, filed Nov. 10, 2006, the entirety of which is incorporated herein by reference.

FIELD OF INVENTION

This invention relates to a system and method for providing directed television advertisements based on speech recognition of telephone conversations.

BACKGROUND

Internet as well as other types of advertisement are a method for increasing the awareness and sales of their products, goods, and ideas. Internet site owners, for example, may use their Internet site for advertisements to generate profits for them by the advertisers, and can actually finance other activities. Internet users exposed to advertisements may become potential buyers of the advertised products or ideas. The Internet can be a doorway to generate awareness of a product all over the world.

Text-messaging voting (SMS) is becoming popular. For example, users watching a TV show can vote in response to polling by the TV show by sending text-messages using a cellular phone. Alternatively, users may place telephone calls to an Interactive Voice Response (IVR) system, and by pressing numbers on the telephone keypad, which generate dual-tone multi-frequency (DTMF) tones, can participate in the TV show by voting, playing, or changing some scenarios of the TV show.

SUMMARY OF INVENTION

The present invention creates new and useful innovative advertising techniques for advertisers. In one embodiment, while a user talks with his landline phone, or cellular phone, the service provider using the present invention recognizes some of the words and phrases the user says. The system may use a speech recognition technology to display relevant advertisements on the user's TV screen, based on the recognized words used in the call, and by using speech recognition.

The present invention may also provide the capability for "triple play" and "quad play" service providers to increase revenues through targeted advertising. This may allow them to provide reduced service rates for their subscribers (end users), or even to provide some of the services free of charge.

In one embodiment, speech recognition activity is only performed with the user's approval, prior to any such call or system use. The goal is for advertisements activities for the users only, and is not meant to harm any user privacy, or to expose the call information to third parties. In addition to advertisements, the present invention may display other relevant information related to the words used in the voice call.

Other objects, features, and advantages of one or more embodiments of the present invention will be enabled from the following detailed description, and accompanying drawings, and the appended claims.

BRIEF DESCRIPTION OF THE DRAWINGS

Embodiments of the present invention will now be disclosed, by way of example only, with reference to the accompanying schematic drawings in which corresponding reference symbols indicate corresponding parts, in which.

DETAILED DESCRIPTION OF INVENTION

Figure 1:
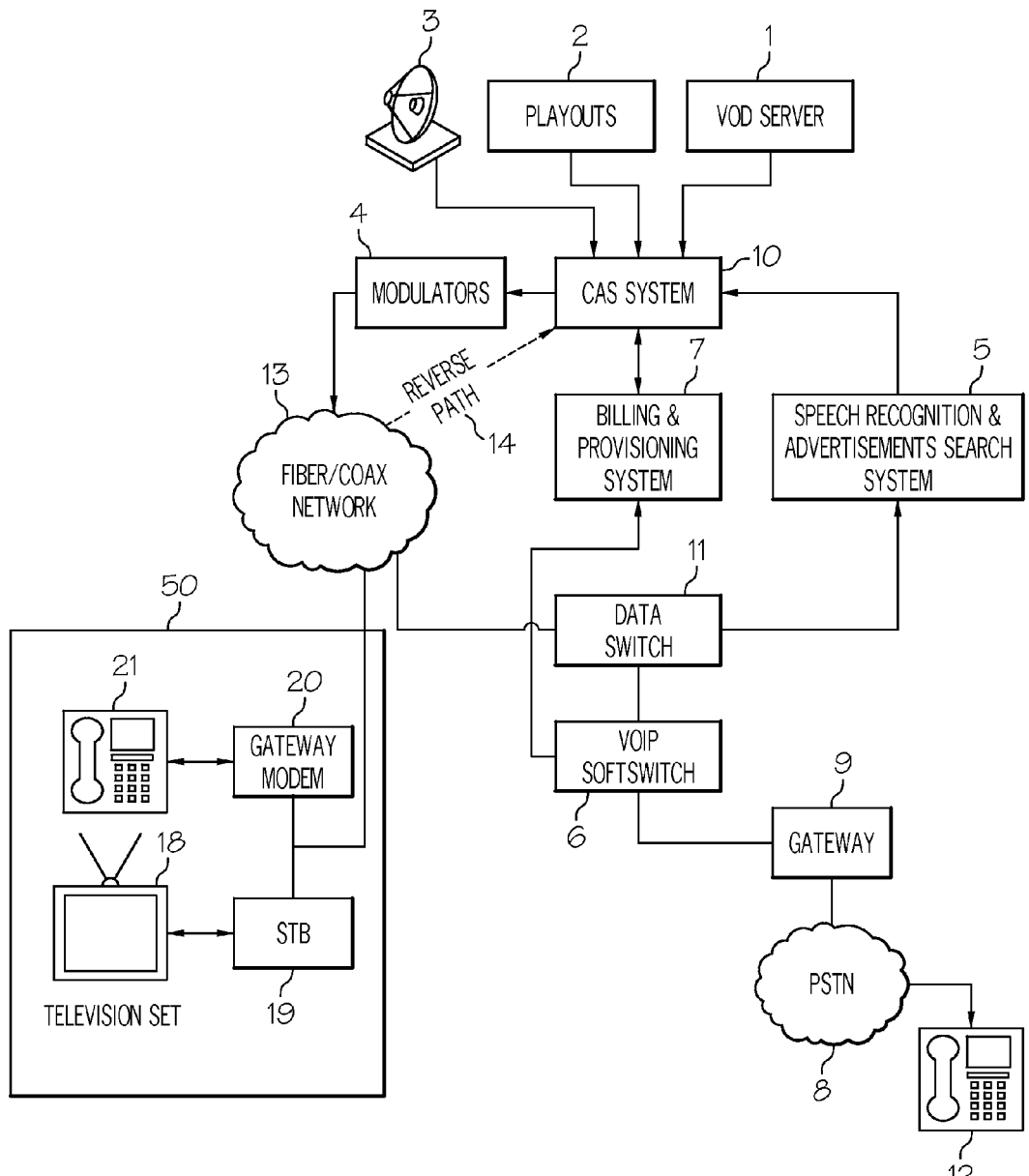
FIG. 1 shows a block diagram of a system architecture, in accordance with an embodiment of the present invention.

FIG. 1 shows a block diagram of a system architecture, in accordance with an embodiment of the present invention. Triple play service providers provide three services to their subscribers (end users): television, telephony and Internet. Quad play service providers further add cellular telephony services and/or other services. It will be appreciated that while a triple/quad play service provider may be a single entity (or appear to the subscriber to be a single entity), that in actuality, the various services may be provided by multiple service providers who are affiliated, or even bundled together by a third party. In one embodiment, the triple/quad service provider is a broadband service provider.

The concept of a triple/quad play service subscriber is depicted generally by element 50. The subscriber's premises 50 includes, for example, a TV set 18 connected to a Set Top Box (STB) 19 and a regular telephone 21 connected to a gateway and cable modem 20. The TV set 18 may include any monitor or display device capable of displaying a television or video signal (e.g. LCD, DLP, plasma, CRT, etc.). The STB 19 may decode and/or decrypt the video feed signal from the service provider for input to the TV set 18. The subscriber's premises 50 may also include Internet services to a computer (not shown) and/or cellular service (not shown) as part of the triple/quad play service package.

The subscriber's premises 50 is connected to the triple/quad play service provider via a fiber-optic or coaxial network 13. In other embodiments, other networking technology may be employed, such as fixed-line, satellite, wireless, cellular, etc. Television may be fed from a cable TV conditional access system (CAS) 10 via the Fiber/Coax network 13 to the subscriber's STB 19 and TV set 18. In one embodiment, CAS 10 may be an Internet Protocol Television (IPTV) service provider.

Telephony service is provided via the Fiber/Coax network 13 to the regular telephone 21 connected to a gateway and cable modem 20. In an embodiment, the subscriber (user) initiates a regular phone call using his phone 21, to a remote telephone 12 connected to the public switched telephony network (PSTN) 8. While a call between two persons is generally envisioned, it will be appreciated that any numbers of persons each using a different phone may participate (e.g., call-waiting, party-lines, multi-part calls, teleconferencing, or the like). The call participants may use the same service providers, but they do not have to.

The telephone conversation may be initiated at the subscriber's premises 50 via Voice over Internet Protocol (VoIP). VoIP allows telephone-like voice conversation to be routed over the Internet and/or any other IP-based network. VoIP data packets may be transferred through a data switch 11 to the PSTN 8 via a gateway 9. The phone 21 may be an IP phone, VoIP phone, IP-phone client application (or "softphone"), or any application for making calls over an Internet or IP-based network. VoIP data packets may be transmitted, for example, using Real Time Protocol (RTP). In one embodiment, the softphone runs on an Analog Terminal Adaptor (ATA) provided with an analog phone.

In other embodiments, the phone 21 may use Plain Old Telephone Service (POTS). For example, the telephone conversation may be initiated at the subscriber's premises 50 via the PSTN, and converted to VoIP by the service provider. In other embodiments, the phone may be a cellular phone connected to the service provide through a cellular network. The cellular phone 10 may be configured to make/receive VoIP calls or may be made VoIP-enabled.

Once the call is initiated, a VoIP softswitch 6 may send call detail records (CDR) to a billing system 7. The CDR may contain detailed information relating to a single call or session passing through the softswitch 6. Accounting software in the billing system 7 processes the CDRs, and produces bills for subscribers.

The billing system 7 enables the call, and sends the caller information (e.g., the subscriber's identifier and IP address) to a speech recognition system 5. The data switch 11 mirrors the data packets sent through it and transmits them to the speech recognition system 5. During the conversation, the call is detected and monitored by the speech recognition system 5.

In one embodiment, the voice recognition activity is performed only with the user's approval, prior to any such call or system use. The present invention is not meant to harm any users' privacy, or to expose call information to third parties, without their consent.

The speech recognition system 5 is configured to recognize key words and phrases from the conversation speech media, and perform a database lookup to get advertisements associated with them. In one embodiment, the speech recognition system 5 provides relevancy scores for the word and phrases identified in the conversations and data items found in the database. For example, the speech recognition system 5 may return the N-th highest scored items, which may be sent to the CAS 10 to be combined in the subscriber's video feed.

The speech recognition system 5 also sends the subscribers' identification that the text items are associated with. The CAS 10 generates a video feed to the subscriber's premises 50 via the Fiber/Coax network 13. For example, the CAS 10 receives video content from various remote content providers via a satellite dish 3. In addition to the satellite dish 3, the CAS 10 may receive content through a Playouts 2, which receives content from local or remote broadcasters, e.g., through fixed-land lines, fiber-optics, or microwave transmissions, etc. The CAS 10 may also has access to a Video of Demand (VoD) server 1 storing video content, which can be accessed remotely by subscribers through a VoD service provided by the triple/quad play service provider.

The VoD server 1 streams video content (e.g., TV shows, movies, sporting events, etc.) in response to users interactively requesting such content. Users may interactively select content with a pointing device, e.g., a remote control, mouse, stylus, or by using any other navigation means via VoD 1. This logic path is depicted by reverse path 14.

Video feeds from the VoD service 1, the Playouts 2, and the satellite dish 3 may be combined along with advertisements from the speech recognition and advertisements search system 5 to form a single video feed for a particular subscriber. Modulators 4 may adjust the frequencies of the video feed, as necessary. The combined video feed is then transmitted via the cable Fiber/Coax network 13 to the subscriber's STB 19 and TV set 18.

Figure 2:
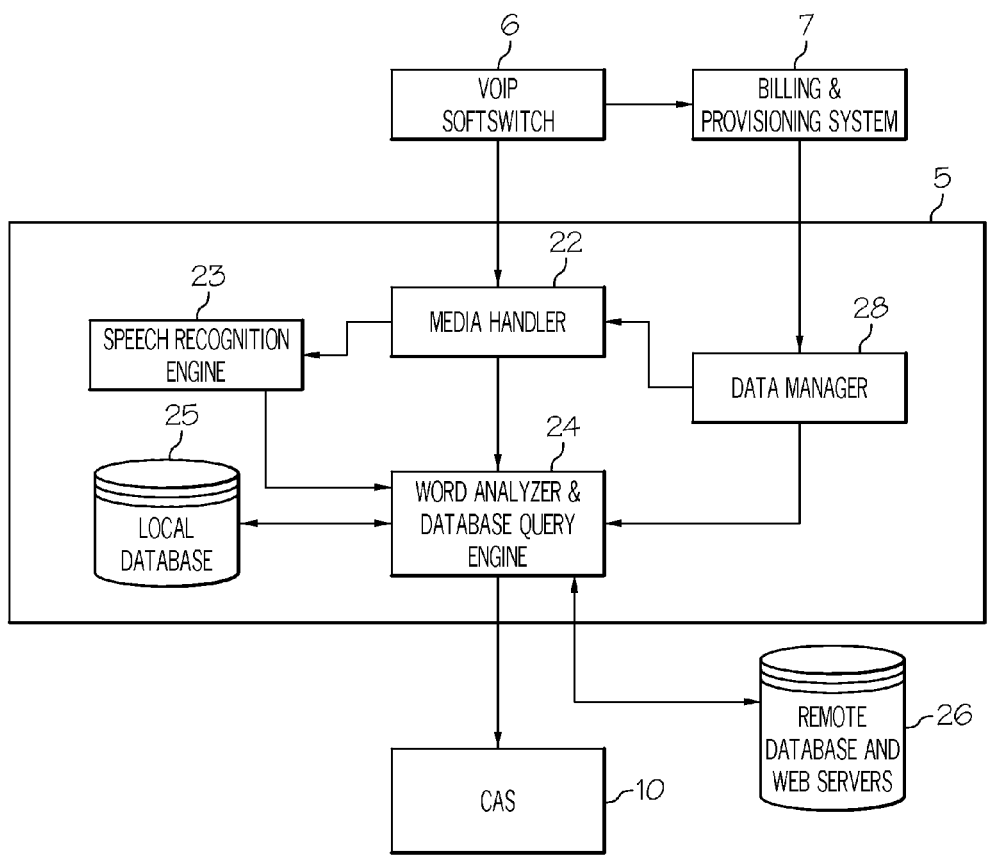
FIG. 2 shows a speech recognition system and how it interacts with other elements in the system, in accordance with an embodiment of the present invention.

FIG. 2 shows a speech recognition system and how it interacts with other elements in the system, in accordance with an embodiment of the present invention. When a call is initiated, the VoIP softswitch 6 sends call detail records (CDR) to a billing system 7. The CDR may then be sent by the billing system 7 to the data manager 28. The CDR may include the subscriber's identifier and the IP address of the telephone generating the call. The subscriber's identifier may be any unique number, code, identifier, or the like, for identifying a particular subscriber.

The data manager 28 provides a media handler 22 with the IP address of the phone 21 so that its speech media, i.e., its data packets will be monitored. The data manager 28 may also send the telephone's number or IP address and subscriber identifier to a word analyzer 24. This data may later be sent on to the CAS 10.

The speech media may be sent by the VoIP softswitch 6 and may be received by the media handler 22. In one embodiment, RTP data packets are used and which can be of any type, for example, Codecs G.711, G.729, G.723, iLBC, GSM, JPEG, etc. The data packets may then be sent to the speech recognition engine 23. In one embodiment, the media handler 22 may first convert the codecs of the data packets, if they are not already supported by the speech recognition engine 23. In another embodiment, the data packets from multiple speech streams using different codecs may be converted to a common codec by the media handler 22.

The speech recognition engine 23 is configured to recognize words and phrases within the speech media. It will be appreciated that speech recognition engine 23 may utilize any speech recognition algorithm, including, for example, any one of the well known speech recognition engines currently on the market, such as: Nuance VoCon® family or NSC Speechblades™.

The words and phrases recognized by the speech recognition engine 23 may be sent to the word analyzer 24. For example, the speech recognition engine 23 may transmit a text file or electronic file including the particular word and phrases recognized in the speech media. Various filtering techniques may be employed to return only relevant data. In one embodiment, the speech recognition engine 23 may only send a particular word or phrase recognized in the speech media to the word analyzer 24, if it is located on a master list of key words and phrases. Thus, other non-essential jargon, words and phrase used in a typical telephone conversation can simple be ignored.

The word analyzer and database query engine 24 performs a database query in a local database 25 and optionally in one or more remote databases 26. Remote database 26 may be maintained by a third party (e.g., advertiser, context provider, affiliate, etc.). The word analyzer and database query engine 24 is configured to generate an appropriately formatted query for the advertising databases 25, 26, for example, using a structured query language (SQL).

The local database 25 and remote databases 26 may be, for example, rational databases and populated with various sources of advertisements, including commercials, video, text, photos, graphics, sounds, music, etc. The databases entries have been previously categorized according to their content.

Advertisers or marketers may pre-screen and index advertisements for particular demographics or other marketing metrics. Further, each advertisement may be associated or indexed with a particular set of words and phrases, which may later be matched with search results from the word analyzer and database query engine 24.

In other embodiments, the databases 25, 26 may be populated with other information, not necessarily related to commercial advertisements, for example, public service announcements (PSA), government warnings, etc.

Any database query algorithm and filtering may be used. In one example, query results are returned to the word analyzer and database query 24, which sorts through the results according to relevancy scores given to each one, according to meta-data queried from the local database 25 and the remote databases 26. In another embodiment, the N-th most relevant advertisements are sent to the CAS 10, to be combined in the video frame data and displayed on the relevant subscriber's TV set 18. In some embodiments, the relevant advertisements may be required formatting according to the CAS 10 requirements. CAS 10 may require video stream only in high-definition (HD), for example.

The data manager 28 also sends the subscriber's identifier to the CAS system 10, so the CAS will be able to associate the advertisements with a particular subscriber.

In one scenario of the invention, two persons might be having a conversation regarding a child's upcoming birthday party. The speech recognition engine 23 may recognize the words "4$^{th}$ birthday," "party" and "gift" within the speech media from a master list of key words and phrases, and return them to the word analyzer and database query engine 24. In response to a query to local database 25, a television commercial for a local toy store may be retrieved and transmitted to CAS 10 for incorporation into the video feed.

In another scenario, two persons may be having a telephone conversation and one person mentions that she is interested in buying a new television set. Upon recognizing the words "buying," "new" and "television," a television commercial for a plasma television might be broadcasted on her TV set 18.

In other embodiments, the speech recognition engine 23 may be configured to recognize the gender, language, or other traits of the persons speaking by analysis of their voice frequencies, tones, pitches, amplitude, patterns, etc. This may be further used to target commercial and other advertising. For example, if the speech recognition engine 23 recognizes that the persons are speaking in Spanish, advertisements and commercials may be broadcasted in Spanish. In another embodiment, the speech recognition engine 23 may be able to identify different persons (users) within the subscriber's household, and select advertising more accordingly.

In another embodiment, advertisers may provide different commercials for the same product/service, which are directed towards different demographics. For example, in the remote database 26 there may be two commercials for the same car. Commercial 1 may be directed towards to audience of men, and Commercial 2 may be directed towards an audience of women. Both commercials may be indexed in the database, e.g., under the same words and phrases such as "buying," "new" and "car." However, based on recognition that the persons speaking are likely women, Commercial 2 may be advantageously selected, rather than Commercial 1.

Further targeting may be coupled with subscribers' profile information. When a subscriber signs up for the inventive advertising service, additional information may be collected, such as age, address, employment, income, marital status, etc. The service provider may provide a website, calling center, kiosks, or other means for signing-up subscribers. New subscribers may be asked a number of questions for collecting marketing data. In addition, follow-ups from customer service representatives, surveys, emails, etc., may be used by the service providers to collect information. Other data mining techniques may retrieve further information regarding the subscriber, from third parties, affiliates, etc.

Using this additional information may further allow marketers and advertisers to better target subscribers. For example, in response to a person discussing an interest in buying a new car, commercials for luxury cars might be directed towards to the subscriber—not only by recognizing words and phrases such as "buying," "new" and "car," but coupled with knowledge from a survey the subscriber is in more affluent income range.

The above scenarios are merely representative and are not meant to be limiting. The various embodiment discussed may be combined to further targeted advertising, based on a number of factors.

Figure 3:
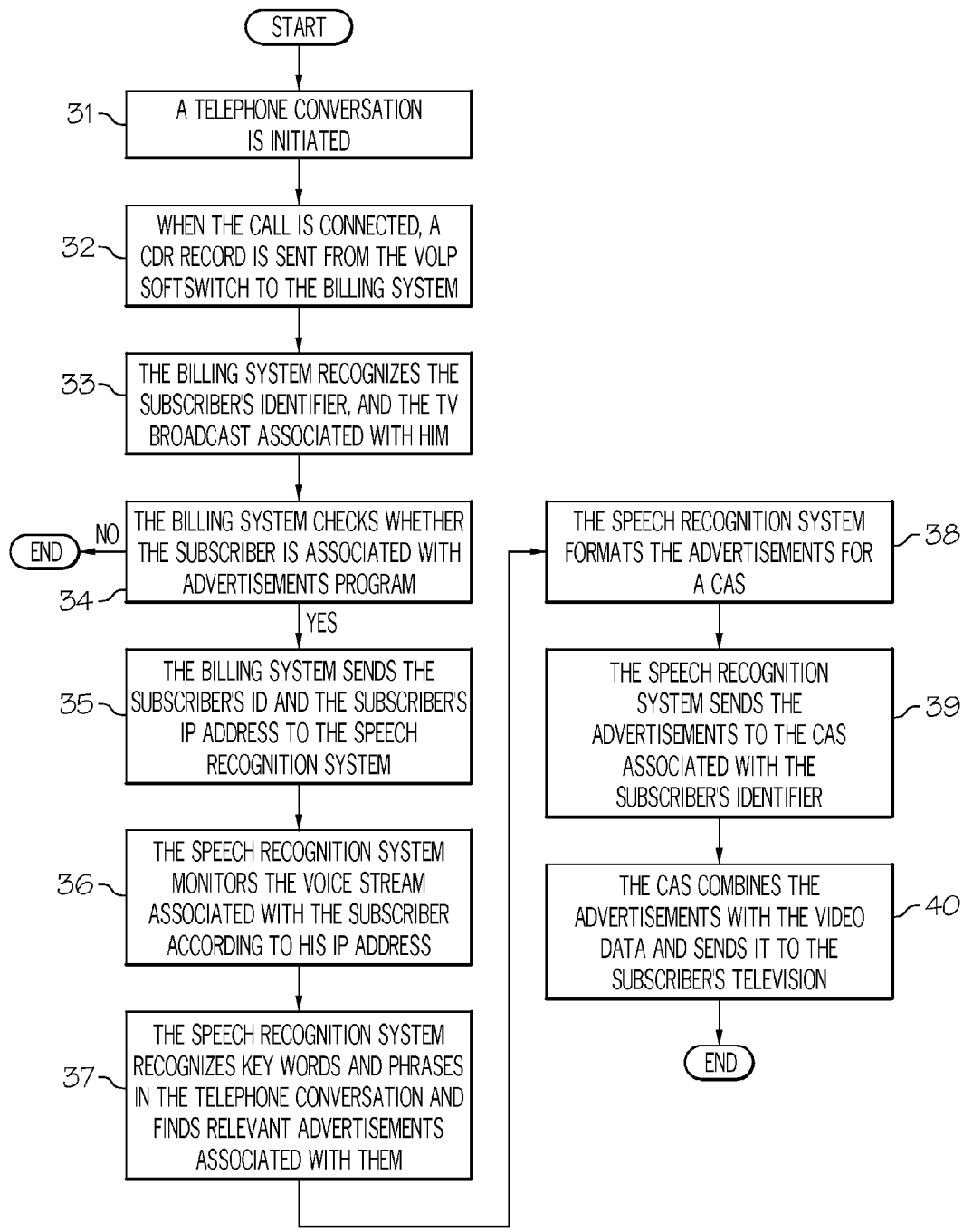
FIG. 3 shows a flowchart for generating television advertisements based on a telephone conversation, in accordance with an embodiment of the present invention.

FIG. 3 shows a flowchart for generating television advertisements based on a telephone conversation, in accordance with an embodiment of the present invention.

Beginning in step 31, a telephone call is initiated by a subscriber (user) using the phone 21 at the subscriber's premises 50 to a remote phone 12 via PSTN 8. In other embodiments, the call might be initiated from the remote phone 12 to the subscriber's phone 21.

In step 32, once the call is connected, a CDR record is sent from the VoIP softswitch 6 to the billing system 7. The CDR may include the subscriber's identifier and the IP address of the telephone generating the call.

Next, the step 33, the billing system 7 recognizes the subscriber's identifier, and the television broadcasts associated with him. Continuing on to step 34, the billing system 7 checks whether the subscriber is associated with the inventive advertisement program.

In one embodiment, the voice recognition activity is performed only with the user's approval, prior to any such call or system use. The present invention is not meant to harm any users' privacy, or to expose call information to third parties, without their consent. In another embodiment, the system may only monitor the speech media of only the subscriber's phone and not the speech media for non-subscribers during the telephone conversation. Also, the system may announce to the user (and even all call participants) that the telephone conversation is being monitored.

In other embodiments, subscribers may receive financial incentives for opting into the advertising program. For example, subscribers might receive telephone call credits, service fee reductions, or even money or cash equivalents, if they opt into the inventive advertising service. Moreover, subscribers may receive other advantages from retail merchants and/or ecommerce websites affiliated with the service provider.

If the subscriber has given authorization to participate in the advertisement program, the method proceeds to step 35; otherwise, the method may end.

In step 35, the billing system 7 may send the subscriber's identifier and the subscriber's IP address to the speech recognition system 5. Next, in step 36, the speech recognition system 5 may monitor the voice data packet stream from the telephone conversation associated with the subscriber according to his IP address, if using VoIP phone or softphone. In other embodiments, the subscriber's telephone number may be used. The speech recognition system 5 uses a speech recognition algorithm that is configured to recognize key words and phrases.

Continuing to step 37, based on key words and phrases in the conversation, the word analyzer 24 finds relevant advertisements and/or other information associated with them. Relying on the subscriber's profile as well as the key words and phrases used within telephone conversations, advertisements may be selected for the subscriber from local database 25 or remote databases 26. In one embodiment, the word analyzer and database query engine 24 may return the N-th most relevant database entries.

In Step 38, speech recognition system 5 formats the advertisements to meet the requirements for a particular CAS 10. Different CASs 10 may be associated with service providers, each having different requirements for format and content. In one embodiment, the advertisements may be configured to fill only a part (e.g., a header or footer) or the entire TV screen.

Next, in step 39, the speech recognition system 5 may send the advertisements to the CAS 10 along with the subscriber's identifier. In step 40, the CAS 10 may combine the advertisement with the video feed data, for example, from the VoD sever 1, Playouts 2, and/or satellite dish 3, via modulators 4. The combined video feed may be sent to the subscriber's STB 19 and the TV set 18 via Fiber/Coax network 13. From the user's point of view, the advertisements appear to be seamlessly inserted within the television feed.

In one embodiment, once the user sees the advertisement on his TV set 18, he can get more information concerning the advertisement by clicking on it with a pointing device, e.g., a remote control, a mouse, stylus, or by using any other navigation means to view or obtain additional details concerning the advertisements. TV set 18 may be coupled via STB 19 to an Internet services provider. For example, the advertisement may comprise a hyperlink link, e.g., a Uniform Resource Locator (URL), which the user can click on with his pointing device and be link to a Internet website whether he get more information. In an embodiment, by selecting the advertiser, the user may be able to send an email to the advertiser. Similarly, the user may activate or cancel the advertisements displayed on his TV set while during a phone call by using the TV remote control. For example, in one embodiment the user may activate or cancel the advertisements displayed on his TV by dialing specific codes on the phone keypad during the call. Those codes will be transmitted by the phone using DTMF signals to the system. The user may also call the service provider's interactive voice response (IVR) system and activate or deactivate the advertisement service, or change his profile settings. In other embodiments, the user may browse, via the web to the service provider's portal, set his profile, and activates or deactivates the advertisements activity.

The billing system 7 may get indications from the CAS 10, concerning the subscriber's TV set 18 status via reverse path 14. For example, if the TV set 18 is turned "off," the billing system 7 may prevent the CAS 10 from integrating advertisements into that subscriber's video feed and/or the system may not assign additional benefits to the subscriber in terms of services cost reductions, credits, etc.

In one embodiment, a sensor may be provided (e.g., in the STB 19 or stand-alone) which is configured to determine whether a wireless phone or mobile device is near the TV set 18. For example, if the wireless phone or mobile device used for the telephone call is away from the TV set 18, e.g., in another room or location altogether, it may not be necessary to integrate advertisements into that subscriber's video feed. In one embodiment, the sensor may track wireless signals to and from wireless phones or mobile devices. The sensor or STB 19 may then send an indication to the CAS 10, indicating that a wireless phone or cellular phone is active and is near the TV set 18. This practice allows the system not to present advertisements when the wireless phone or mobile device is not in proximity of the TV set 18.

The advertisements may be broadcasted during the telephone conversation or some time thereafter. In other embodiments, advertisements concerning the telephone conversation may be displayed on the TV sets of a group of users of the same service provider. Similarly, advertisements associated with conversations for multiple users may be displayed on the TV sets of a group of subscribers of the same service provider. In another embodiment, advertisements associated with conversations for multiple users may be displayed on the TV sets of a group of subscribers of different service providers.

In other embodiments, multiple users' conversations will be displayed on a specific TV set, using a relevant algorithm. For example, where two or more phones are associated with the same subscriber's premises 50, which has only one TV set 18, the system may prioritize the advertisements to be displayed on the TV based on the different profiles associated with the two phones, or based on a specific voice character recognized on one of the phone lines, by the system.

While this invention has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the invention following, in general, the principles of the invention and including such departures from the present disclosure as come within known or customary practice in the art to which the invention pertains, and as may be applied to the essential features hereinbefore set forth and followed in the spirit and scope of the appended claims.

What is claimed is:

1. A system for providing television advertisements based on a telephone conversation between two or more persons comprising:
    a speech recognition system for a telephone service configured to monitor a telephone conversation between two or more persons and to recognize key words and phrases spoken by one or more of the persons during the conversation;
    a database having one or more advertisements indexed by words and phrases;
    a search engine for querying the database based on key words and phrases recognized during the conversation;
    a television broadcast for a television service configured to integrate at least one advertisement from the database into the video feed to the television of at least one of the persons based on key words and phrases recognized during the conversation, wherein the television broadcast including the at least one advertisement is received during the telephone conversation.

2. The system according to claim 1, wherein television and telephone services used by at least one of the two or more persons are provided by a broadband service provider.

3. The system according to claim 2, wherein the service provider is a triple play or quad play service provider.

4. The system according to claim 1, wherein the device used for the telephone conversation by at least one of the two or more persons is a VoIP phone, VoIP softphone, POTS phone, cellular phone, wireless device, VoIP-enabled phone, or an Analog Terminal Adaptor (ATA) connected to an analog phone.

5. The system according to claim 1, wherein the device used for receiving the television broadcast by at least one of the two or more persons is a television, monitor, display, or computer.

6. The system according to claim 1, wherein the device used for receiving the television broadcast by at least one of the two or more persons is connected to a cable TV conditional access system (CAS) or Internet Protocol Television (IPTV).

7. The system according to claim 1, wherein the at least one advertisement comprises a hyperlink link.

8. The system according to claim 1, wherein the at least one advertisement includes a commercial, text, graphics, photos, sounds, music, or a combination thereof.

9. The system according to claim 1, wherein prior to monitoring the telephone conversations the service provider has authorization from at least one of the two or more persons.

10. The system according to claim 9, wherein at least one of the two or more persons receives telephone call credits, service fee reductions, cash equivalents or money, for authorizing call monitoring.

11. The system according to claim 1, wherein the at least one advertisement is displayed on the television sets of a group of subscribers, the group having the same service provider used by at least one of the two or more persons.

12. The system according to claim 1, wherein the at least one advertisement is displayed on the television sets of a group of subscribers, the group having at least one service provider different from the service provider used by at least one of the two or more persons.

13. The system according to claim 1, wherein at least one of the two or more persons may activate or cancel the at least one advertisement displayed on his television set.

14. The system according to claim 13, wherein the at least one of the two or more persons may activate or cancel the at least one advertisement displayed on his television set by (i) pressing codes by the phone keypad during the call, (ii) calling an interactive voice response (IVR) system and pressing codes, or (iii) navigating to a service provider's Internet portal and updating personal profile parameters.

15. The system according to claim 1, wherein at least one advertisement is displayed on the television of at least one of the two or more person, while two or more phone calls on two or more phones are taking place at same premises.

16. The system according to claim 15, wherein the at least one advertisement is displayed on a television of the at least one of the two or more person, based on (i) a profile associated with one of the phones, or (ii) a specific voice character recognized on one of the phones.

17. The system according to claim 2, wherein the service provider provides (i) public switched telephony network (PSTN) service or cellular telephony service and (ii) cable, satellite or Internet Protocol Television (IPTV) service.

18. The system according to claim 1, further comprising a sensor associated with the television of at least one of the two or more persons, the sensor configured to determined whether a wireless phone or device used for the telephone conversation is in a proximity of the television set of the at least one of the two or more persons.

19. The system according to claim 1, further comprising a billing system which recognizes the phone number or Internet Protocol (IP) address of at least one of the two or more persons and the television broadcast associated with him.

20. The system according to claim 19, further comprising and a television conditional access system (CAS) for integrating the at least one advertisement into the video feed.

21. The system according to claim 20, wherein the billing system directs the CAS to integrate the at least one advertisement into the video feed.

22. The system according to claim 1 wherein the telephony service provider for the telephone conversation and the television service provider for the television broadcast of at least one of the two or more persons are different.

23. A method for providing television advertisements based on a telephone conversation between two or more persons comprising:
   monitoring a telephone conversation between two or more persons and recognizing key words and phrases spoken by one or more of the persons during the conversation;
   querying a database having one or more advertisements indexed by words and phrases based on key words and phrases recognized during the conversation; and
   transmitting a television broadcast which integrates at least one advertisement from the database into the video feed to the television of at least one of the persons based on key words and phrases recognized during the conversation
   wherein prior to monitoring the telephone conversation the service provider has authorization from at least one of the two or more persons.

24. The method of claim 23, wherein the television broadcast is provided by a broadband provider.

25. The method of claim 24, wherein the broadband provider is a triple play or quad play service provider.

26. The method of claim 23, wherein the advertisement comprises a hyperlink link.

27. The method of claim 23, wherein at least one of the two or more persons receives telephone call credits, service fee reductions, cash equivalents or money, for authorizing call monitoring.

* * * * *